(12) United States Patent
Udriste

(10) Patent No.: US 7,607,729 B1
(45) Date of Patent: Oct. 27, 2009

(54) INERTIA LOCK APPARATUS

(75) Inventor: Daniel I. Udriste, Weston, FL (US)

(73) Assignee: B/E Aerospace, Inc., Wellington, FL (US)

( * ) Notice: Subject to any disclaimer, the term of this patent is extended or adjusted under 35 U.S.C. 154(b) by 267 days.

(21) Appl. No.: 11/689,973

(22) Filed: Mar. 22, 2007

(51) Int. Cl.
*B60N 2/42* (2006.01)
(52) U.S. Cl. .................................. 297/216.1
(58) Field of Classification Search ............. 297/216.1, 297/216.16, 216.18, 344.11; 296/68.1
See application file for complete search history.

(56) References Cited

U.S. PATENT DOCUMENTS

| | | | |
|---|---|---|---|
| 2,777,531 A | | 1/1957 | Erickson |
| 2,864,432 A | | 12/1958 | Limberg |
| 3,463,543 A | | 8/1969 | Zellar |
| 3,603,638 A | | 9/1971 | McGregor et al. |
| 3,897,101 A | * | 7/1975 | Hess ........................ 296/68.1 |
| 4,294,488 A | | 10/1981 | Pickles |
| 4,664,442 A | * | 5/1987 | Stolper et al. .......... 297/216.18 |
| 4,909,571 A | * | 3/1990 | Vidwans et al. ........ 297/378.11 |
| 4,988,134 A | | 1/1991 | Vidwans et al. |
| 5,556,159 A | | 9/1996 | Canteleux |
| 5,556,160 A | | 9/1996 | Mikami |
| 5,636,424 A | | 6/1997 | Singer et al. |
| 5,882,080 A | * | 3/1999 | Houghtaling et al. .. 297/378.11 |
| 6,250,705 B1 | * | 6/2001 | Zuch ........................ 296/68.1 |
| 6,533,351 B2 | * | 3/2003 | Deptolla .................. 297/216.2 |
| 2003/0052519 A1 | | 3/2003 | Reynolds et al. |

* cited by examiner

*Primary Examiner*—David Dunn
*Assistant Examiner*—Patrick Lynch
(74) *Attorney, Agent, or Firm*—Drinker Biddle & Reath LLP

(57) ABSTRACT

An apparatus is provided for securing a moveable seat substructure of a vehicle seating system to a stationary base substructure of the vehicle seating system during a dynamic event such as, for example, rapid vehicle deceleration. In one aspect, an inertia lock apparatus is provided for a vehicle seating system and includes: a striker bar; a pendulum latch pivotally moveable between a normal orientation and a latching orientation, wherein the pendulum latch includes a first end with a mass portion configured to pivot about a pivot point relative to a predetermined deceleration, a second end with a catch portion configured to catch the striker bar in the latching orientation and a cam slot intermediate the first end and the second end; and a lock mechanism configured to prevent the pendulum latch from moving from the latching orientation to the normal orientation. In another aspect, a vehicle seating system including the inertia lock apparatus is provided.

16 Claims, 8 Drawing Sheets

INERTIA LOCK APPARATUS

FIELD OF THE INVENTION

This invention pertains generally to a vehicle seating system. More particularly the invention relates to an inertia lock apparatus which, during a dynamic event such as rapid vehicle deceleration, provides a failsafe for securing a moveable seat substructure of a vehicle seating system to a base substructure that is attached to a floor of the vehicle.

BACKGROUND OF THE INVENTION

To provide passengers with additional in-flight comfort, newer aircraft seating systems are more adjustable than conventional seating systems and may allow passengers to, among other things, laterally (e.g., fore and aft) translate a seat substructure (i.e., seating surface including a seatback and seatbase) relative to a base substructure that is attached to a floor of the aircraft. However, until now, such aircraft seating systems have presented a challenge with respect to preventing the moveable seat substructures from becoming disconnected from the fixed stationary base substructure during a dynamic event such as may be experienced by an aircraft during an aborted takeoff or crash landing.

Inertia latch mechanisms are known in the automotive industry for preventing forward seat movement and seatback folding during a rapid deceleration of the automotive vehicle. Examples of such mechanisms can be found in U.S. Pat. Nos. 4,294,488 (Pickles) and 4,988,134 (Vidwans et al.). While these mechanisms utilize latching devices, including pendulum-type latches that respond to a predetermined deceleration, they do not have a locking mechanism that positively locks them into place once they have been engaged. As a result, these latch mechanisms may suffer from bounce-back or vibration and become disengaged.

One inertia lock apparatus that overcomes the foregoing-described problems is shown in FIGS. 1, 2A and 2B. Referring to FIG. 1, the inertia lock apparatus 100' is configured inside the seating system 200' with a pendulum latch 120' of inertia lock apparatus 100' being coupled to the base substructure 220', which is stationary, and a striker bar 230' being connected to the seat substructure 240', which is at least laterally moveable forward and backward above the base substructure 220' as indicated by the double-headed arrow labeled with "Front" and "Back."

The base substructure 220' of vehicle seating system 200' includes a left base rail 222l' (not shown), a right base rail 222r', an intermediate base rail 222i', a front tubular member 224' and a rear tubular member 226'. As can be appreciated, the left, right and intermediate base rails 222l', 222r', 222i' are spaced apart from each other and generally parallel to each other, extending generally parallel with the right and left sides of the seatbase (250, FIG. 4). Furthermore, the front and rear tubular members 224', 226' are spaced apart and generally parallel to each other, extending generally parallel with the front and rear sides of the seatbase (250, FIG. 4). The front and rear tubular members 224', 226' couple with the left, right and intermediate base rails 222l', 222r', 222i' to configure the base substructure 220' as a generally rectangular, rigid frame.

Although not illustrated in FIG. 1, one can appreciate that the seat substructure 240' may be substantially similar to seat substructure 240 (FIG. 4) and include a seatbase (250, FIG. 4), a seatback (260, FIG. 4) that may be pivotally coupled to a rear portion of the seatbase and configured to recline from a generally vertical orientation, a legrest (270, FIG. 4) that may be pivotally coupled to a front portion of the seatbase and configured to raise and lower, and left and right armrests (280, 280', FIG. 4) that may be coupled to right and left sides of the seatbase. As illustrated in FIG. 1, the inertia lock apparatus 100' is provided on the right side of the example vehicle seating system 200'. However, the inertia lock apparatus 100' may alternatively be provided on the left side of the example vehicle seating system 200'. Furthermore, it should be appreciated that the example vehicle seating system 200' may include additional inertia lock apparatuses, for example, a left side inertia lock apparatus and a right side inertia lock apparatus.

As described previously, the seat substructure 240' is configured to laterally move forward and rearward above the base substructure 220'. To this end, the seat substructure 240' as shown includes on its bottom surface a gear rack 242' or the like having a plurality of teeth 244'. Further, the stationary base substructure 220' includes at its front side a spur gear 228' that is rotatably coupled with the axle of a rotary actuator 232. The spur gear 228' meshes with the plurality of teeth 244' of the gear rack 242' so that the seat substructure 240' moves when the actuator 232 is activated.

As further shown in FIG. 1, the inertia lock apparatus 100' is connected to the vehicle seating system 200' proximate a bottom portion of the seat substructure 240' such that, when the seat substructure 240' is oriented in a TTL (i.e., taxi, takeoff, and landing position wherein the seatback is substantially upright and the seat substructure 240' is not translated substantially forward or rearward relative to the base substructure 220'), the inertia lock apparatus 100' is substantially proximate the striker bar 230'. As can be appreciated, the inertia lock apparatus 100' provides a failsafe to catch the striker bar 230' which may move forwardly with the seat substructure 240' during a dynamic event, thereby preventing the seat substructure 240' from becoming uncoupled from the base substructure 220' if one or more of the actuator 232, spur gear 228' or gear rack 242' were to fail, break or otherwise malfunction. Although the seat substructure 240' is described as including the striker bar 230' and the gear rack 242', and the base substructure 220' is described as including the spur gear 228' and rotary actuator 232, the seat substructure 240' and base substructure 220' may be configured otherwise, for example, vice-versa such that the seat substructure 240' includes the spur gear 228' and rotary actuator 232', and the base substructure 220' includes striker bar 230' and the gear rack 242'. Furthermore, other mechanism and devices, for example, linear actuators, that are known in the art may be suitably employed additionally with or alternatively to the foregoing for moving the seat substructure 240' relative to the base substructure 220'.

Referring now to FIGS. 2A and 2B, the inertia lock apparatus 100' of FIG. 1 is further illustrated and the operation thereof will be described in further detail. As shown in FIG. 2A, the inertia lock apparatus 100' includes a pendulum latch 120' and a lock mechanism 160'. The pendulum latch 120' may machined, cast or the like of a suitable material such as metal (e.g., steel, aluminum, etc.) and is elongate along the forward-rearward direction. The pendulum latch 120' as illustrated includes a forward end 102' with a catch portion 140' and a rearward end 104' with a mass portion 130'. As shown, the mass portion 130' and catch portion 140' may be unitarily formed (e.g., cast, machined, molded or the like) such that the pendulum latch 120' is one-piece. As shown, the catch portion 140' includes a hook 142' that extends generally upward and rearward from a bottom portion of the forward end 102', providing a generally U-shaped channel 144' that is configured to align with the striker bar 230' as best illustrated in FIG. 2B for catching thereon.

The pendulum latch 120' is pivotally attached to the base substructure 220' at pivot point 150' that is configured at a top portion of the pendulum latch 120' intermediate the forward end 102' and the rearward end 104'. The pivot point 150' may be a fastener such as a screw, bolt, rod, pin or the like that is extended through an aperture of the pendulum latch 120' and attached to the base substructure 220'. As shown in FIG. 2A, the mass portion 130' and the pivot point 150' are configured so that the catch portion 140' of the pendulum latch 120' is normally oriented to be lower than the striker bar 230 (i.e., the normal orientation or state of the pendulum latch 120') so that the seat substructure 240' may be moved forward and rearward in an unimpeded manner during normal in-flight conditions. Furthermore, the pendulum latch 120' is configured so that the pendulum latch 120' rotates clockwise about the pivot point 150' only during a dynamic event having a predetermined force or acceleration. More particularly, the mass portion 130' and the pivot point 150' are configured to cooperate such that the mass portion 130' will rotate downward and forward (as indicated in FIG. 2A by the curved arrow labeled "R") when the vehicle experiences a predetermined deceleration in the range of about 6 G-9 G (i.e., six to nine multiples of the acceleration due to gravitational force −9.8 meters/second$^2$). As best illustrated in FIG. 2B, once the vehicle has experienced the predetermined deceleration, the pendulum latch 120' is shown in its latching orientation or state wherein the catch portion 140' is positively aligned and maintained in that orientation or state to catch the striker bar 230'. In this way, the seat substructure 240' is prevented from potentially becoming decoupled from the base substructure 220' during a dynamic event.

Referring to FIGS. 2A and 2B, the lock mechanism 160' of inertia lock apparatus 100' is described. As shown in FIG. 2A, the lock mechanism 160' includes a pawl member 162' configured generally forward and downward or lower relative to the pivot point 150'. As shown, the pawl member 162' may be a fastener such as a screw, bolt, rod, pin or the like that is connected to the right base rail 222r' and which extends through an aperture 122' (having a sideways L-shape) of the pendulum latch 120' and past the left-hand or inward-facing surface of the pendulum latch 120'. As shown in FIG. 2A, the pawl member 162' is oriented generally forward in the aperture 122' when the pendulum latch 120' is in its normal orientation or state. As shown in FIG. 2B, the pawl member 162' is oriented generally rearward in the aperture 122' when the pendulum latch 120' is in its latching orientation or state (i.e., after rotating clockwise on the pivot point 150' due to an occurrence of a dynamic event, for example).

A stop member 170' is configured proximate the aperture 122' and the pawl member 162' to obviate, inhibit or otherwise prevent the pendulum latch 120' from becoming misaligned (i.e., rotating in a clockwise direction) with the striker bar 230' after the pendulum latch 120' has moved to its latching orientation or state. As shown, the stop member 170' is pivotally coupled to the pendulum latch 120' by lock pivot point 172' below the aperture 122' and intermediate the rearward and forward ends 124', 126' of the aperture 122'. The stop member 170' as shown includes a generally triangular-shaped body with an upper corner or shoulder 174', a lower corner or shoulder 176' and a forward corner or shoulder 178'. The stop member 170' is biased such that upper shoulder 174' is configured to normally extend above the lower surface 128' of aperture 122'.

As shown, lower shoulder 176' is coupled to one end of an extension spring 182', the other end of which is coupled to an anchor portion 146' of the pendulum latch 120' proximate the mass portion 130'. Although the bias for stop member 170' is provided by the extension spring 182' as shown, the bias may be provided by other springs such as a torsion spring, a compression spring or by other biasing and elastic members or devices known in the art. As can be appreciated, the extension spring 182' has a tension to provide a counterclockwise rotational bias that normally urges the rearward edge (i.e., the edge extending between the upper shoulder 174' and lower shoulder 176') of stop member 170' against a stop 180' (e.g., a fastener as shown). Thus configured, as the pendulum latch 120' rotates in a clockwise manner, the aperture 122' moves generally forward and upward so that the pawl member 162' contacts the upper shoulder 174' thereby causing the stop member 170' to pivot clockwise about lock pivot point 172'. As the stop member 170' is moved forward (i.e., by further pivoting of the pendulum latch 120') past the pawl member 162', the spring 182' provides a restoring force to pivot the stop member 170' counterclockwise such that upper shoulder 174' again extends above the lower surface 128' of aperture 122'. As shown in FIG. 2B, once the stop member 170' has traveled forward past the pawl member 162', the stop member 170' (particularly the upper shoulder 174') interferes with the pawl member 162' to provide a positive stop that obviates, inhibits or otherwise prevents the pendulum latch 120' from rotating counterclockwise and moving from the latching orientation or state to the normal orientation or state. In this way, the inertia lock apparatus 100' is configured to resist bounce-back (e.g., due to impact loads), thereby ensuring positive latching and substantially irreversible securing of the seat substructure 240' to the base substructure 220'.

The foregoing-described inertia lock apparatus may be advantageously employed for various seating systems. However, further refinements to the apparatus would be important developments in the art.

BRIEF SUMMARY OF THE INVENTION

An apparatus is provided for securing a moveable seat substructure of a vehicle seating system, for example an aircraft passenger seat or chair, to a stationary base substructure of the vehicle base substructure during a dynamic event such as, for example, rapid vehicle deceleration. The apparatus includes a striker bar, a pendulum latch being pivotally moveable between a normal orientation and a latching orientation, the pendulum latch having a first end including a mass portion configured to pivot about a pivot point relative to a predetermined deceleration, a second end including a catch portion configured to catch the striker bar in the latching orientation, and a cam slot intermediate the first and second ends; and a lock mechanism configured to prevent the pendulum latch from moving from the latching orientation to the normal orientation, the lock mechanism cooperating with a cam surface of the cam slot for preventing pivoting of the pendulum latch during a deceleration that is less than the predetermined deceleration. In another aspect, a vehicle seating system including the inertia lock apparatus is provided.

DETAILED DESCRIPTION OF THE EMBODIMENTS

Figure 1:
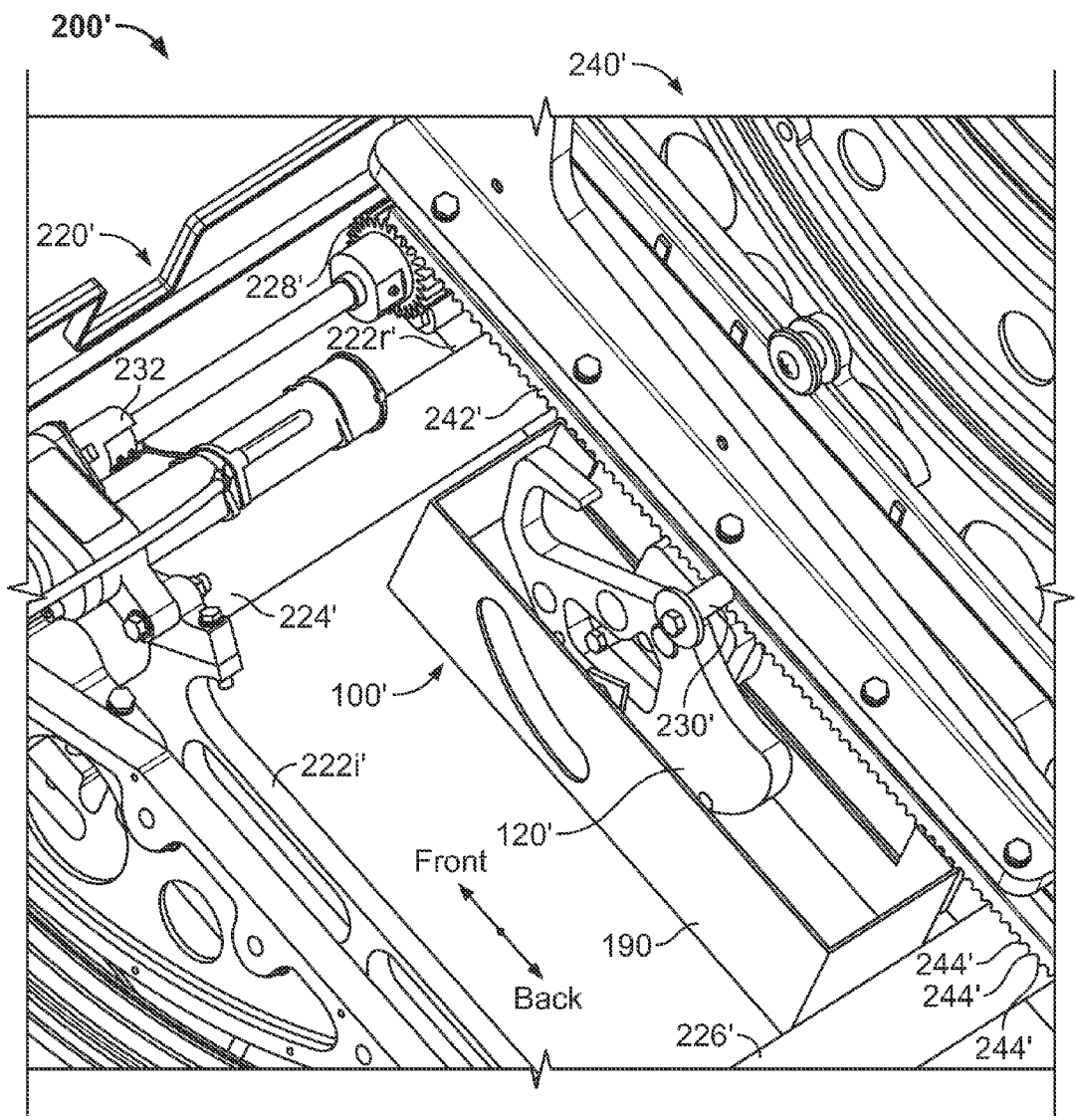
FIG. 1 illustrates a perspective view of a prior art locking mechanism.
Figure 2A:
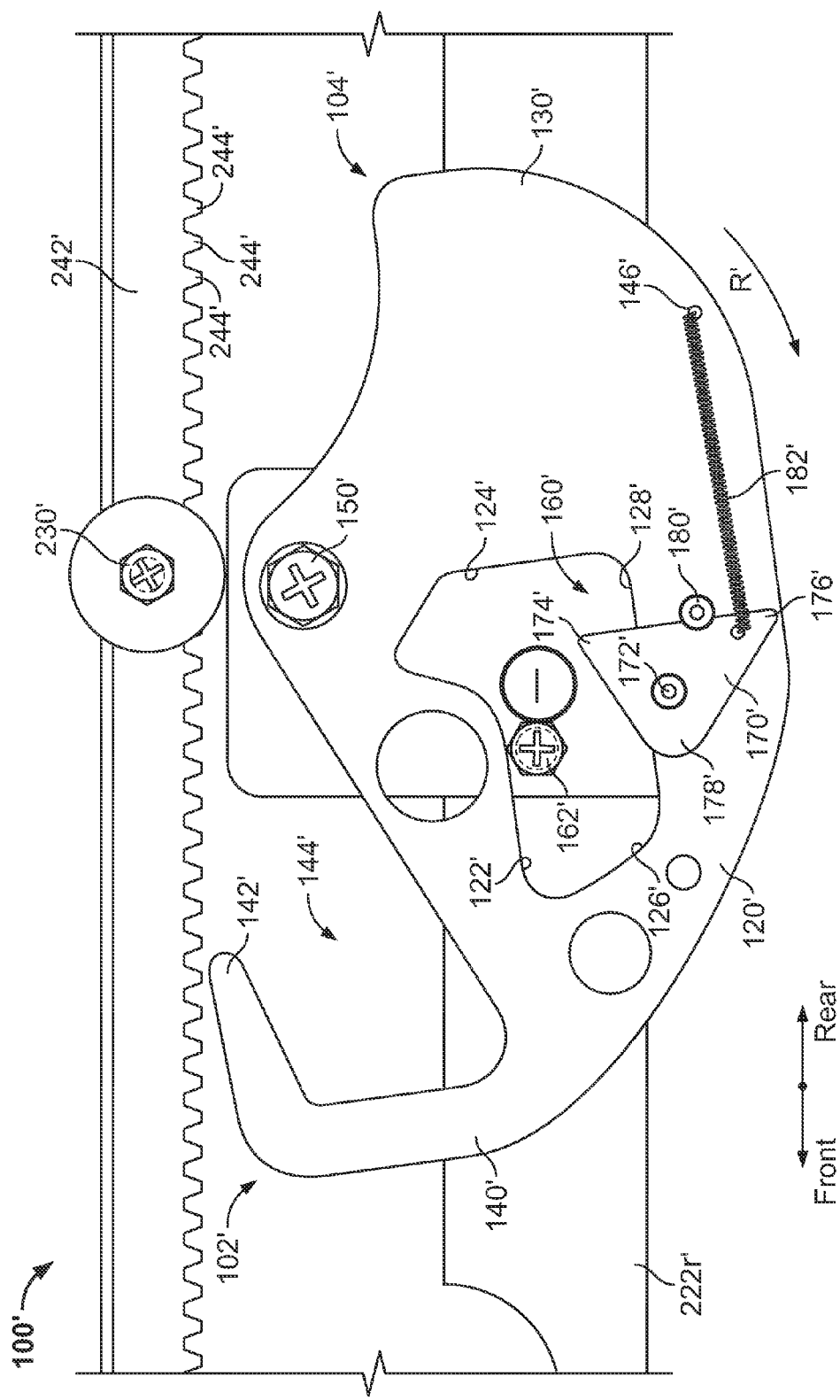
FIGS. 2A and 2B illustrate close-up side elevation views of the inertia lock apparatus of the prior art as shown in FIG. 1.
Figure 2B:
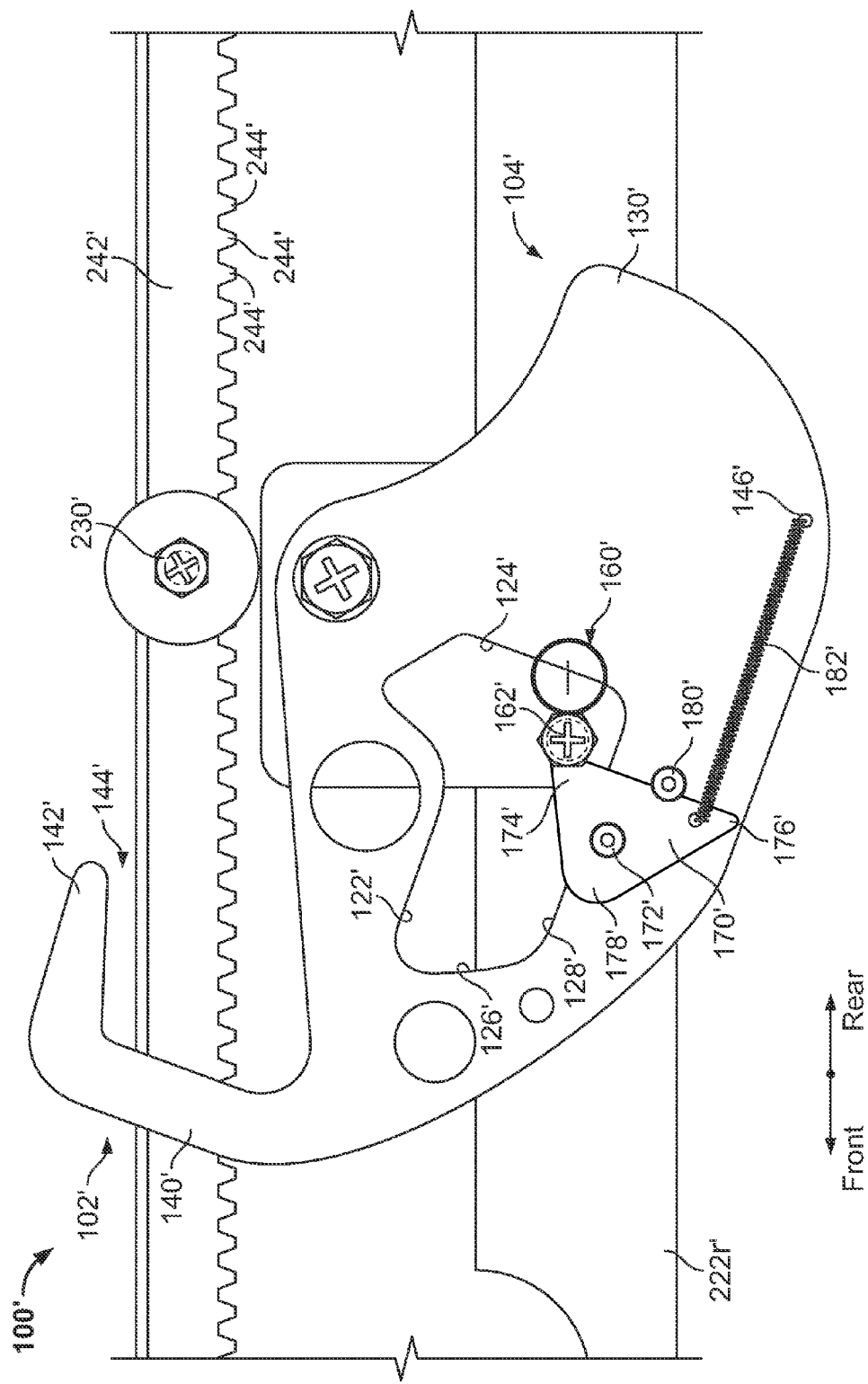
Figure 3A:
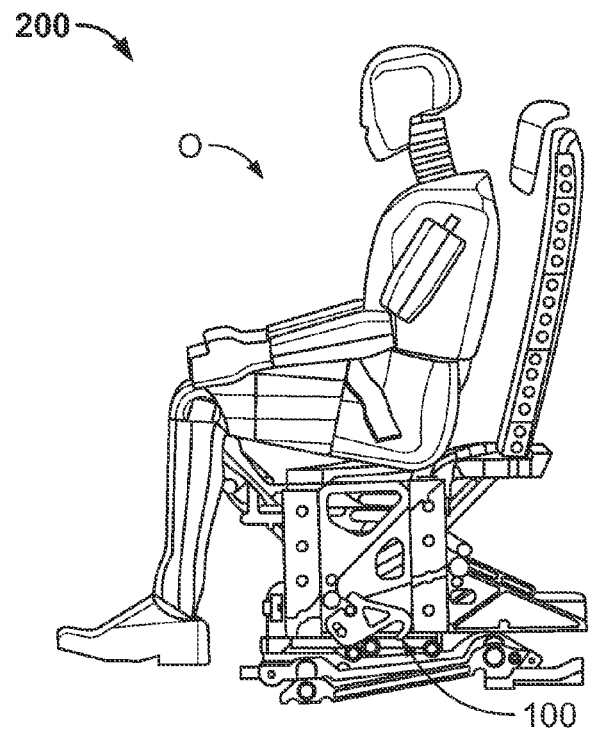
FIGS. 3A-3D illustrate an example vehicle seating system including an embodiment of an inertia lock apparatus in accordance with the present invention wherein the vehicle seating system is restraining an occupant during a dynamic event.
Figure 3B:
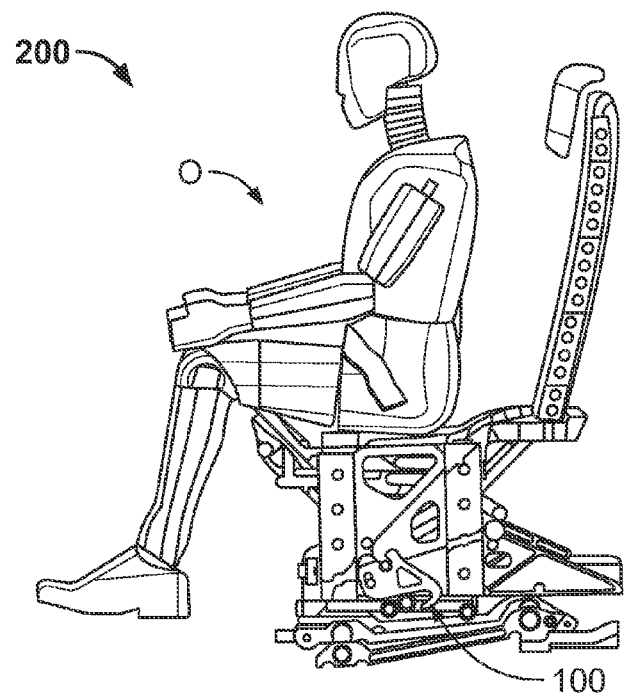
Figure 3C:
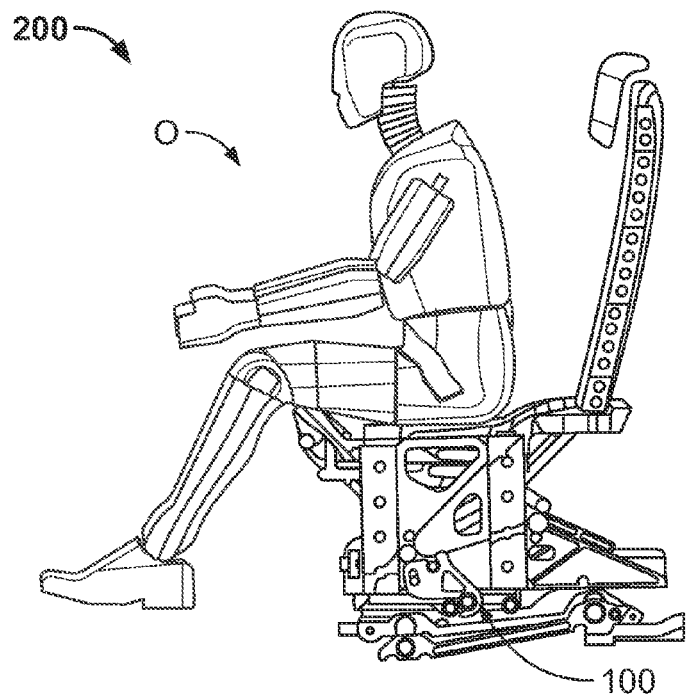
Figure 3D:
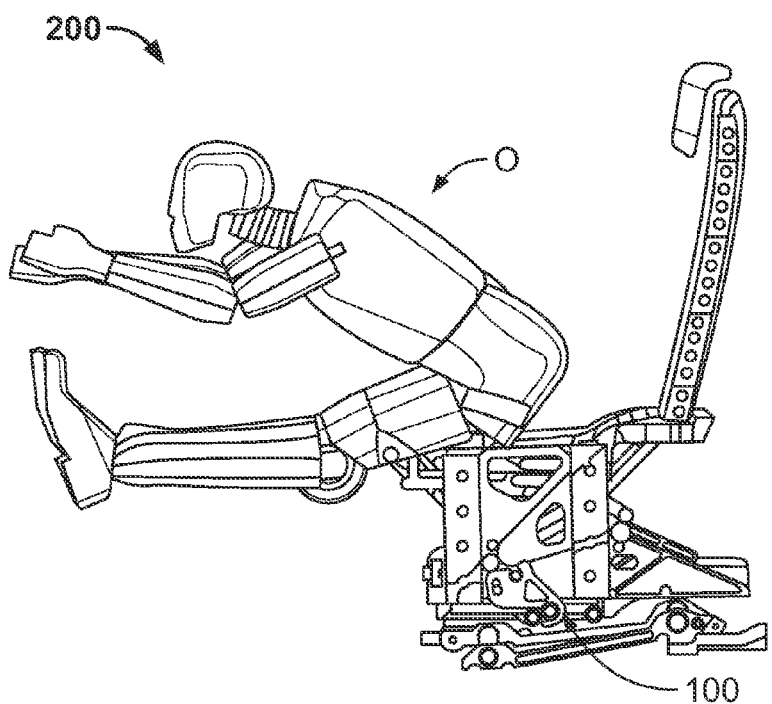

Referring now to the Figures, an embodiment of an inertia lock apparatus in accordance with the present invention is described. FIGS. 3A-3D when viewed in succession illustrate an occurrence of a dynamic event in which a vehicle, for example an aircraft, is rapidly decelerated. As shown in FIGS. 3A-3D, a vehicle passenger or occupant O is seated in a seating system 200 that includes an embodiment of an improved inertia lock apparatus 100 in accordance with the present invention. FIG. 3A illustrates the apparatus 100, seating system 200 and the occupant O wearing a lap seatbelt before the occurrence of the rapid deceleration. FIG. 3B illustrates, at the instance of occurrence of the rapid deceleration, the occupant O moving somewhat forward in the seating system 200 due to the occupant's momentum but being restrained by the lap seatbelt. FIGS. 3C and 3D illustrate the occupant O moving further forward in the seating system 200 due to the occupant's momentum but being restrained by the lap seatbelt. In some instances, a coupling such as, for example an actuator, a gear or linkage, between the moveable seat substructure and the stationary base substructure may fail due to the strain caused by the occupant O moving forward at a velocity greater than the instant velocity of the decelerating vehicle.

Figure 4:
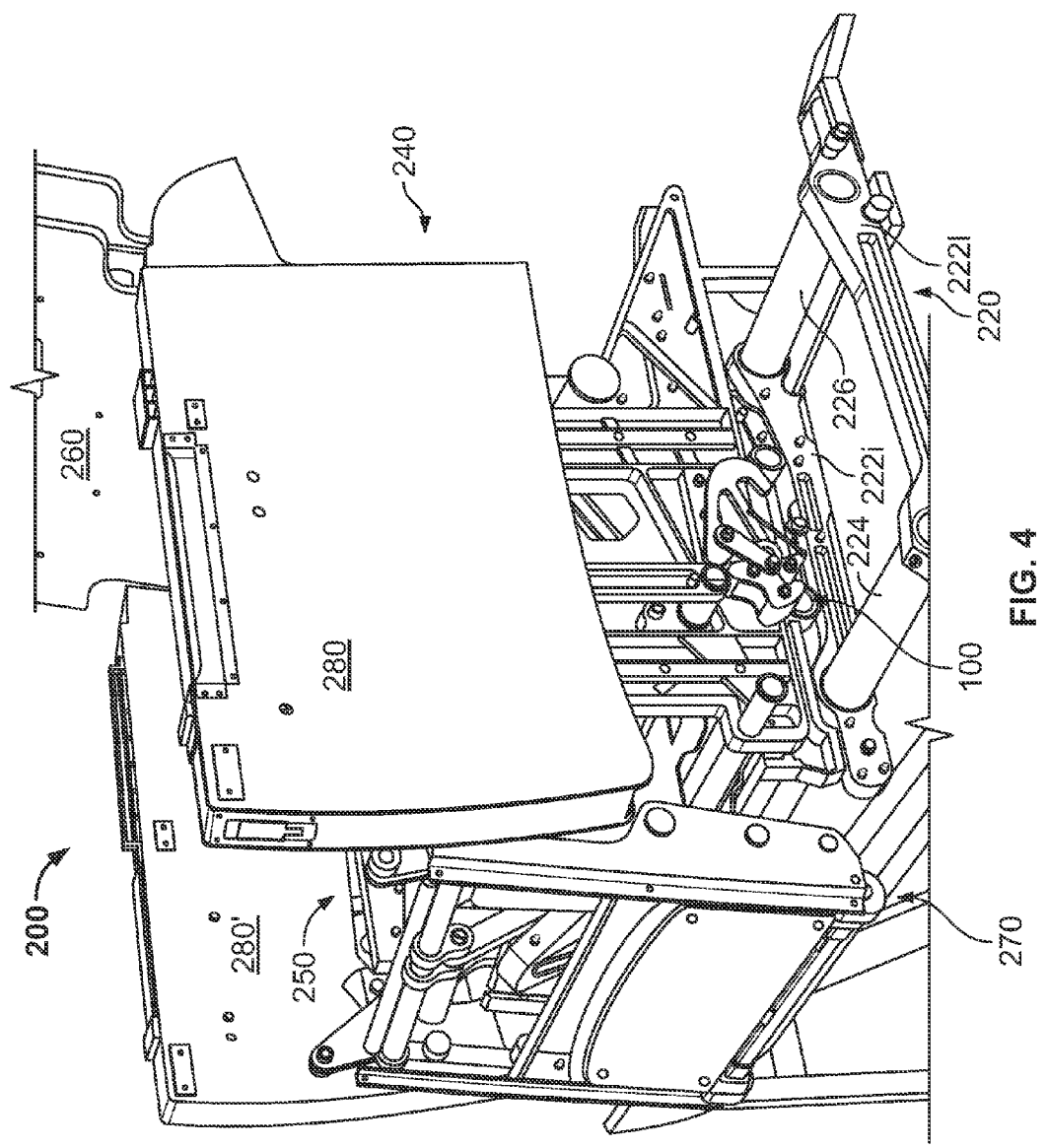
FIG. 4 illustrates a perspective view of the vehicle seating system including the inertia lock apparatus embodiment of FIGS. 3A-3D.
Figure 5A:
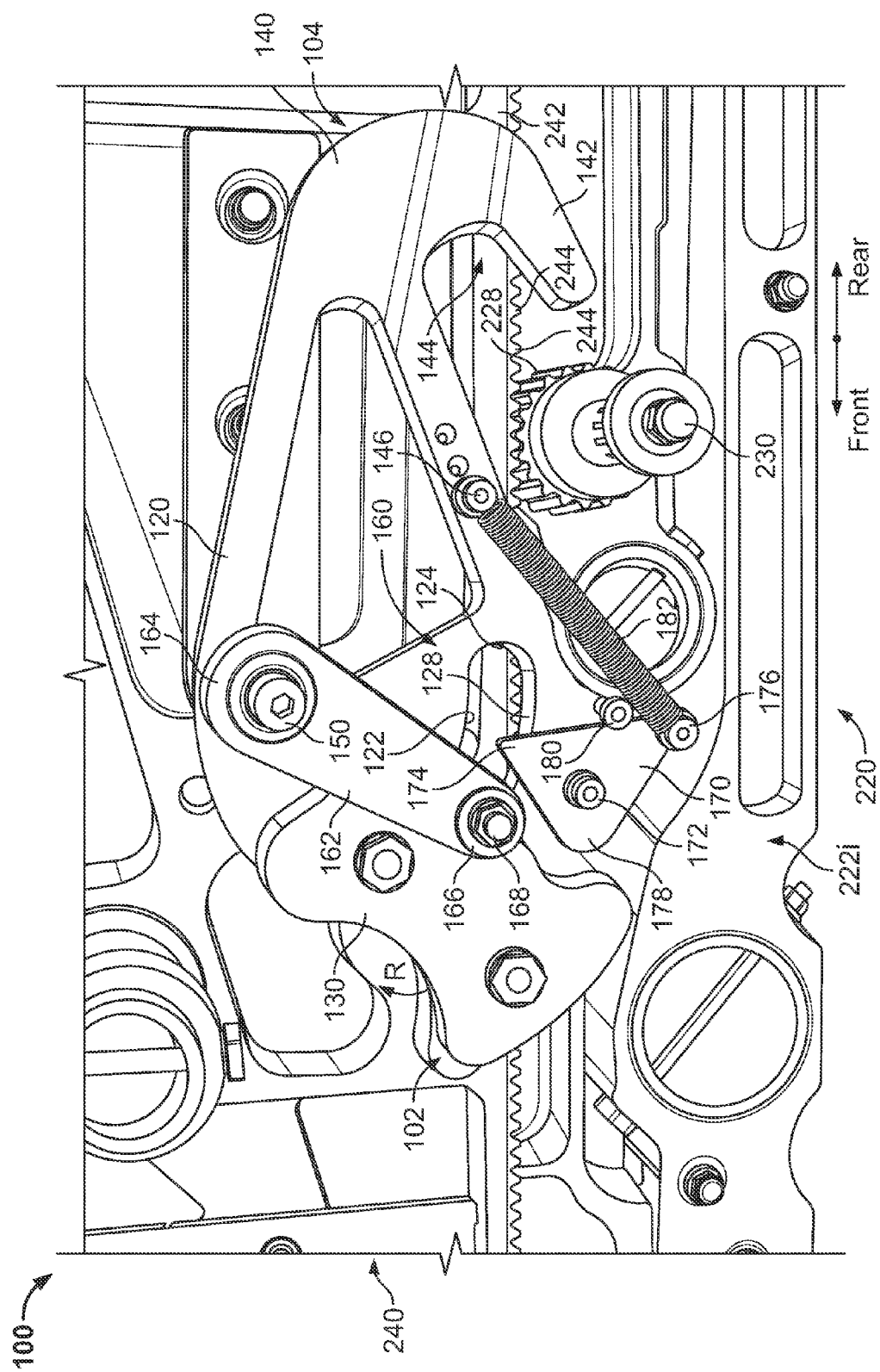
FIGS. 5A and 5B illustrate close-up side elevation views of the inertia lock apparatus of FIG. 4.
Figure 5B:
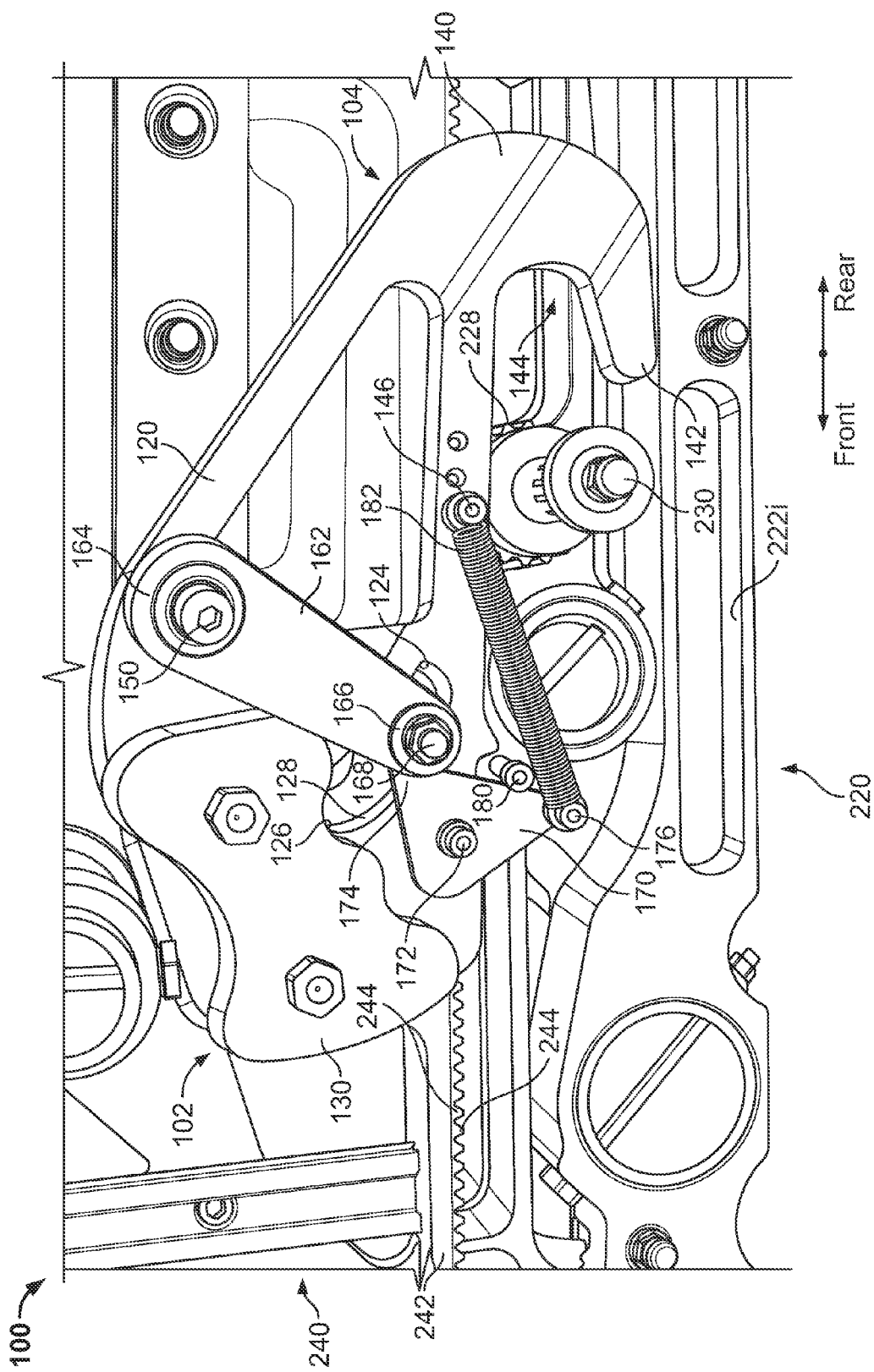

In accordance with the present invention, FIGS. 4, 5A and 5B show an embodiment of an inertia lock apparatus used with a vehicle seating system. As shown in FIG. 4, one embodiment of the inertia lock apparatus 100 is employed for a vehicle seating system 200, for example an aircraft seating system. Although the seating system 200 may be configured inside a vehicle in different ways, for example, in seating rows perpendicular to a lengthwise axis of the vehicle, in seating rows parallel to a lengthwise axis, etc., as should be appreciated hereinafter, the terms "front," "fore" and "forward" are used interchangeably to indicate a vector directed outward from the front of an occupant sitting in the seating system 200. Furthermore, the terms "rear," "rearward," "aft," "back" and "backward" are used interchangeably to indicate a vector directed outward from the back of an occupant sitting in the seating system 200.

The illustrated example vehicle seating system 200, shown in FIG. 4, includes a base substructure 220 that is attached to a floor surface within the vehicle, and a seat substructure 240 (also known in the art as a seat carriage) that is coupled to the base substructure 220 and which is laterally-moveable, minimally in the forward and rearward directions above the base substructure 220 and generally parallel to the floor surface. Of course, the seating substructure 240 may be configured to move in other ways, such as, for example, rotation and/or leftward and rightward lateral movement relative to the base substructure 220. The base substructure 220 of vehicle seating system 200 includes a left base rail 222*l*, a right base rail 222*r* (not shown), an intermediate base rail 222*i*, a front tubular member 224 and a rear tubular member 226. As can be appreciated, the left, right and intermediate base rails 222*l*, 222*r*, 222*i* are spaced apart from each other and generally parallel to each other, extending generally parallel with the right and left sides of the seatbase 250. Furthermore, the front and rear tubular member 224, 226 are spaced apart and generally parallel to each other, extending generally parallel with the front and rear sides of the seatbase 250. The front and rear tubular members 224, 226 couple with the left, right and intermediate base rails 222*l*, 222*r*, 222*i* to configure the base substructure 220 as a generally rectangular, rigid frame.

As further shown in FIG. 4, the seat substructure 240 includes a seatbase 250, a seatback 260 that may be pivotally coupled to a rear portion of the seatbase 250 and configured to recline from a generally vertical orientation, a legrest 270 that may be pivotally coupled to a front portion of the seatbase 250 and configured to raise and lower, and left and right armrests 280, 280' that may be coupled to right and left sides of the seatbase 250. As illustrated, an inertia lock apparatus 100 is provided on the left side of the example vehicle seating system 200. Although not illustrated in FIG. 4, it should be appreciated that the example vehicle seating system 200 may include additional inertia lock apparatuses, for example, a left side inertia lock apparatus and a right side inertia lock apparatus. Furthermore, it should be appreciated that the inertia lock apparatus 100 may alternatively be provided on the right side of the example vehicle seating system 200. The inertia lock apparatus 100 is illustrated as being connected to the example vehicle seating system 200 proximate a bottom portion of the seat substructure 240 intermediate the front and rear ends of the base rails 222*l*, 222*r*, 222*i*. However, the inertia lock apparatus 100 may be configured elsewhere, for example, proximate to front or rear ends of the base rails 222*l*, 222*r*, 222*i*. For simplicity's sake hereinafter, since the example vehicle seating system 200 is substantially right-left symmetrical when bisected by a vertical plane midway between the left and right armrests 280, 280', only the left side of the example vehicle seating system 200 will be discussed.

Referring now to FIGS. 5A and 5B, the inertia lock apparatus 100 of FIG. 4 and the operation thereof will be described in further detail. As shown in FIG. 5A, the inertia lock apparatus 100 includes a pendulum latch 120 and a lock mechanism 160. The pendulum latch 120 may machined, cast or the like of a suitable material such as metal (e.g., steel, aluminum, etc.) and is elongate along the forward-rearward direction. The pendulum latch 120 as illustrated includes a forward end 102 with a mass portion 130 and a rearward end 104 with a catch portion 140. As can be appreciated, the mass portion 130 may be bolted (as shown in FIGS. 4, 5A and 5B) or otherwise fixedly attached to the forward end 102 of the pendulum latch 120. Alternatively, the mass portion 130 and catch portion 140 may be unitarily formed (e.g., cast, machined, molded or the like) such that the pendulum latch 120 is one-piece. As shown, the catch portion 140 includes a hook 142 that extends generally downward and forward from a bottom portion of the rearward end 104, providing a generally U-shaped channel 144 that is configured to catch a striker bar 230. A cam slot 122, which will be discussed hereinafter in further detail, is configured intermediate the mass portion 130 and the catch portion 140.

The pendulum latch 120 is pivotally attached to the seat substructure 240 at pivot point 150 that is configured at a top portion of the pendulum latch 120 intermediate the forward end 102 and the rearward end 104. The pivot point 150 may be a fastener such as a screw, bolt, rod, pin or the like that is extended through an aperture of the pendulum latch 120 and attached to the seat substructure 240. The mass portion 130 and the pivot point 150 are configured so that the catch portion 140 of the pendulum latch 120 is normally elevated above the striker bar 230 (i.e., the normal state or orientation of the pendulum latch 120) so that the seat substructure 240 may be moved forward and rearward in an unimpeded manner during normal in-flight conditions. Furthermore, the pendulum latch 120 is configured so that the pendulum latch 120 rotates clockwise about the pivot point 150 only during a dynamic event. That is, the mass portion 130 and the pivot point 150 are configured such that the mass portion 130 will rotate upward and rearward (as indicated in FIG. 5A by the curved arrow labeled "R") when the vehicle experiences a predetermined deceleration in the range of about 6 G-9 G (i.e., six to nine multiples of the acceleration due to gravitational force $-9.8$ meters/second$^2$). Furthermore, as can be appreciated from FIG. 5B, the cam slot 122 includes a front end 126, which, when the pendulum latch 120 is disposed in its normal orientation or state (as shown in FIG. 5A), contacts a cam follower 168 for preventing opposite (i.e., forward or counterclockwise) rotation of the latch 120. Once the vehicle has experienced the predetermined deceleration, the pendulum latch 120 is shown in FIG. 5B to be in its latching orientation or state wherein the catch portion 140 is positively aligned and maintained in that orientation or state to catch the striker bar 230 thereby preventing the seat substructure 240 from potentially becoming decoupled from the base substructure 220 during a dynamic event.

Referring to FIGS. 5A and 5B, the lock mechanism 160 of inertia lock apparatus 100 is described. As shown in FIG. 5A, the lock mechanism 160 includes a pawl member 162 configured with a generally elongated body including a first end 164 and a second end 166. The first end 164 of pawl member 162 is connected to the pivot point 150, which is connected to the side of the seat substructure 240, and the second end 166 is connected to the seat substructure 240 by way of the cam follower 168 that extends through the cam slot 122 and contacts a lower surface 128 of the cam slot 122 between its rear end 124 and front end 126. When the pendulum latch 120 rotates from its normal orientation or state to its latching orientation or state, the cam follower 168 moves arcuately rearward in the cam slot 122, which is below the pivot point 150 and intermediate the forward and rearward ends 102, 104 of the pendulum latch 120. The cam follower 168 may be a fastener such as a screw, bolt, rod, pin or the like that is extended through an aperture of the second end 166 and which is captively disposed in the aperture 122. The cam follower 168 is configured to frictionally contact and travel along the cam surface 128 to prevent the pendulum latch 120 from fully rotating to the latching orientation or state when a deceleration has occurred that is less than the predetermined deceleration.

A stop member 170 is configured proximate the aperture 122 and the second end 166 of pawl member 162 to obviate, inhibit or otherwise prevent the second end 166 from moving forward after the pendulum latch 120 has moved to its latching orientation or state. As shown, the stop member 170 is pivotally coupled to the pendulum latch 120 by lock pivot point 172 below the aperture 122 and intermediate the rearward and forward ends 124, 126 of the aperture 122. The stop member 170 as shown includes a generally triangular-shaped body with an upper corner or shoulder 174, a lower corner or shoulder 176 and a forward corner or shoulder 178. The stop member 170 is biased such that upper shoulder 174 is configured to normally extend above the lower surface 128 of aperture 122.

As shown in FIGS. 4, 5A, and 5B, lower shoulder 176 is coupled to one end of an extension spring 182, the other end of which is coupled to an anchor portion 146 of the pendulum latch 120 proximate the catch portion 140. Although the bias for stop member 170 is provided by the extension spring 182 as shown, the bias may be provided by other springs such as a torsion spring, compression spring or by other biasing and/or elastic members or devices known in the art. As can be appreciated, the extension spring 182 has a tension to provide a counterclockwise rotational bias that normally urges the rearward edge (i.e., the edge extending between the upper shoulder 174 and lower shoulder 176) of stop member 170 against a stop 180 (e.g., a fastener as shown). Thus configured, when the pendulum latch 120 rotates, the cam slot 122 and the stop member 170 move frontwardly relative to the pawl member 162 and the cam follower 168 (which are generally stationary) so that the cam follower 168 contacts the upper shoulder 174 causing the stop member 170 to rotate clockwise about lock pivot point 172. After the cam follower 168 has rotated the stop member 170 during rotation of the pendulum latch 120, the cam slot 122 travels further frontward so that the stop member 170 (particularly the upper shoulder 174) has moved past the cam follower 168 and the spring 182 provides a restoring force to rotate the stop member 170 counterclockwise such that upper shoulder 174 again extends above the lower surface 128 of aperture 122. As shown in FIG. 5B, once the upper shoulder 174 has traveled frontward past the cam follower 168, the stop member 170 interferes with the cam follower 168 to provide a positive stop that obviates, inhibits or otherwise prevents the pendulum latch 120 from rotating counterclockwise and moving from the latching orientation or state to the normal orientation or state. In this way, the inertia lock apparatus 100 is configured to resist bounce-back (e.g., due to impact loads), thereby ensuring positive latching and substantially irreversible securing of the seat substructure 240 to the base substructure 220. Furthermore, as can be appreciated, static and moving friction contact between the cam surface 128 and the cam follower 168 provides an additional advantage of preventing positive engagement of the lock mechanism 160 during instances when, for example, a deceleration occurs that is less than the predetermined deceleration.

As further shown in FIG. 5A, the inertia lock apparatus 100 is connected to the example vehicle seating system 200 proximate a bottom portion of the seat substructure 240 such that, when the seat substructure 240 is oriented in a TTL (i.e., taxi, takeoff, and landing position wherein the seatback 260 is substantially upright and the seat substructure 240 is not translated forward or rearward relative to the base substructure 220), the inertia lock apparatus 100 is substantially proximate the striker bar 230. As can be appreciated from viewing FIGS. 4, 5A, and 5B, the inertia lock apparatus 100 provides a failsafe to catch the striker bar 230 during a dynamic event, thereby preventing the seat substructure 240 from becoming uncoupled from the base substructure 220 if one or more of the actuator 232, spur gear 228 or gear rack 242 were to break. Although the seat substructure 240 is described as including the gear rack 242 and the base substructure 220 is described as including the spur gear 228, striker bar 230 and rotary actuator 232, the seat substructure 240 and base substructure 220 may be configured otherwise, for example, vice-versa such that the seat substructure 240 includes the spur gear 228, striker bar 230 and rotary actuator 232, and the base substructure 220 includes the gear rack 242. Furthermore, other mechanism and devices, for example, linear actuators, that are known in the art may be suitably employed additionally with or alternatively to the foregoing for moving the seat substructure 240 relative to the base substructure 220.

The use of the terms "a" and "an" and "the" and similar referents in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Various embodiments of this invention are described herein. It should be understood that the illustrated embodiments are exemplary only, and should not be taken as limiting the scope of the invention. Although the embodiments of an inertia lock apparatus disclosed herein are equally applicable to all types of seating systems, they have been discussed herein in the context of aircraft seating, including single seats, couches, and divans. This should not be interpreted as limiting the scope of the invention in any way.

What is claimed is:

1. An inertia lock apparatus for a vehicle seating system including a base substructure attached to a vehicle floor, and a laterally moveable seat substructure coupled with the base substructure, the apparatus comprising:
    a striker bar connected to one of the base substructure and the laterally moveable seat substructure;
    a pendulum latch coupled at a pivot point to the other one of the base substructure and the laterally moveable seat substructure for movement between a normal orientation and a latching orientation, the pendulum latch including a first end with a mass portion configured to pivot about the pivot point relative to a predetermined deceleration, a second end including a catch portion configured to catch the striker bar in the latching orientation, and a cam slot with a cam surface intermediate the first end and the second end;
    a lock mechanism coupled with the pendulum latch and configured to prevent the pendulum latch from moving from the latching orientation to the normal orientation, the lock mechanism including a lock pivot point connected to the pendulum latch below the pivot point and intermediate the first and second ends, a stop member connected to the pendulum latch proximate the lock pivot point, and a lock member pivotally coupled to the lock pivot point and including a normal bias that urges the lock member against the stop member; and
    a combination cam follower and pawl member, the combination cam follower and pawl member being configured in the cam slot for intimate contact with the cam surface for pivoting the lock member about the lock pivot point and for preventing pivoting of the pendulum latch during a deceleration that is less than the predetermined deceleration.

2. The inertia lock apparatus of claim 1 wherein the predetermined deceleration is in the range of about 6 G to about 9 G.

3. The inertia lock apparatus of claim 1 wherein the striker bar comprises an axle of a rotary actuator configured to move the laterally moveable seat substructure relative to the base substructure.

4. The inertia lock apparatus of claim 1 wherein the lock mechanism further comprises a spring connecting the lock member with a portion of the pendulum latch.

5. The inertia lock apparatus of claim 1 wherein the lock member is generally triangular in shape and includes an upper shoulder that extends past the cam surface for contacting with the combination cam follower and pawl member.

6. The inertia lock apparatus of claim 5 wherein the upper shoulder and the combination cam follower and pawl member interfere to prevent the pendulum latch from moving from the latching orientation to the normal orientation.

7. The inertia lock apparatus of claim 5 further comprising an elongated link with a first end coupled with the pivot point, and a second end coupled with the combination cam follower and pawl member.

8. A vehicle seating system comprising:
    a base substructure connected to a floor of the vehicle;
    a laterally moveable seat substructure coupled with the base substructure;
    a striker bar connected to one of the base substructure and the laterally moveable seat substructure;
    a pendulum latch coupled at a pivot point to the other one of the base substructure and the laterally moveable seat substructure for movement between a normal orientation and a latching orientation, the pendulum latch comprising a first end including a mass portion configured to pivot about the pivot point relative to a predetermined deceleration, a second end including a catch portion configured to catch the striker bar in the latching orientation, and a cam slot with a cam surface intermediate the first end and the second end;
    a lock mechanism coupled with the pendulum latch and configured to prevent the pendulum latch from moving from the latching orientation to the normal orientation, the lock mechanism including a lock pivot point connected to the pendulum latch below the pivot point and intermediate the first and second ends, a stop member connected to the pendulum latch proximate the lock pivot point, and a lock member pivotally coupled to the lock pivot point and including a normal bias that urges the lock member against the stop member; and
    a combination cam follower and pawl member, the combination cam follower and pawl member being configured in the cam slot for intimate contact with the cam surface for pivoting the lock member about the lock pivot point and for preventing pivoting of the pendulum latch during a deceleration that is less than the predetermined deceleration.

9. The vehicle seating system of claim 8 wherein the predetermined deceleration is in the range of about 6 G to about 9 G.

10. The vehicle seating system of claim 8 wherein the striker bar comprises an axle of a rotary actuator configured to move the laterally moveable seat substructure relative to the base substructure.

11. The vehicle seating system of claim 8 wherein the lock mechanism further comprises a spring connecting the lock member with a portion of the pendulum latch.

12. The vehicle seating system of claim 8 wherein the lock member is generally triangular in shape and includes an upper shoulder that extends past the cam surface for contacting with the combination cam follower and pawl member.

13. The vehicle seating system of claim 12 wherein the upper shoulder and the combination cam follower and pawl member interfere to prevent the pendulum latch from moving from the latching orientation to the normal orientation.

14. The vehicle seating system of claim 13 further comprising an elongated link including a first end pivotally coupled with the pivot point, and a second end coupled with the combination cam follower and pawl member.

15. An aircraft seating system comprising:
- a stationary base substructure connected to a floor of the aircraft, the stationary base substructure including a rotary actuator having a gear;
- a laterally moveable seat carriage coupled with the stationary base substructure, the laterally moveable seat carriage including a gear rack that meshes with the gear;
- a failsafe means configured to prevent the laterally moveable seat carriage from becoming uncoupled from the stationary base substructure during a deceleration in the range of about 6 g to about 9 g, the failsafe means comprising:
  - a striker means comprised of an axle of the rotary actuator on which the gear is disposed, the striker means connected to one of the stationary base substructure and the laterally moveable seat carriage;
  - a latch means coupled at a pivot point to the other one of the stationary base substructure and the laterally moveable seat carriage for movement between a normal orientation and a latching orientation, the latch means comprising a first end including a mass portion configured to pivot about the pivot point relative to a predetermined deceleration, a second end including a catch portion configured to catch the striker means in the latching orientation;
  - a lock means configured to prevent the latch means from moving from the latching orientation to the normal orientation: and
  - a means for preventing pivoting of the latch means during a deceleration that is less than the predetermined deceleration.

16. An aircraft seating system comprising:
- a stationary base substructure connected to a floor of the aircraft, the stationary base substructure including an actuator having a gear;
- a laterally moveable seat carriage coupled with the stationary base substructure, the laterally moveable seat carriage including a gear rack that meshes with the gear;
- a failsafe means configured to prevent the laterally moveable seat carriage from becoming uncoupled from the stationary base substructure during a deceleration in the range of about 6 g to about 9 g, the failsafe means comprising:
  - a striker means connected to one of the stationary base substructure and the laterally moveable seat carriage;
  - a latch means coupled at a pivot point to the other one of the stationary base substructure and the laterally moveable seat carriage for movement between a normal orientation and a latching orientation, the latch means comprising a first end including a mass portion configured to pivot about the pivot point relative to a predetermined deceleration, a second end including a catch portion configured to catch the striker means in the latching orientation;
  - a lock means configured to prevent the latch means from moving from the latching orientation to the normal orientation; and
  - a means for preventing pivoting of the latch means during a deceleration that is less than the predetermined deceleration, said means for preventing pivoting comprised of:
  - a cam slot including a cam surface, the cam slot being configured intermediate the first end and the second end of the latch means; and
  - a pawl member of the lock means that extends through the cam slot, the pawl member being in intimate contact with the cam surface.

* * * * *